United States Patent

Loewe et al.

[11] Patent Number: 5,928,444
[45] Date of Patent: Jul. 27, 1999

[54] BATTERY-POWERED, WHEEL-MOUNTED TIRE PRESSURE MONITOR AND INFLATION SYSTEM

[76] Inventors: Richard Thomas Loewe, 12882 Olympia Way, Santa Ana, Calif. 92705; Gary Burton Shelly, 3 Pointe Dr. No., 116, Brea, Calif. 92621; Fredrick Mark Moran, 2176 E. La Vieve La., Tempe, Ariz. 85284

[21] Appl. No.: 08/484,924

[22] Filed: Jun. 7, 1995

[51] Int. Cl.[6] ..................................................... B60C 23/10
[52] U.S. Cl. ............................................................ 152/418
[58] Field of Search ..................................... 152/415, 418

[56] References Cited

U.S. PATENT DOCUMENTS

| | | | |
|---|---|---|---|
| 540,519 | 6/1895 | Stanford | 152/425 |
| 561,628 | 6/1896 | Tomlinson | 152/425 |
| 1,128,455 | 2/1915 | Keith | 152/418 |
| 1,229,039 | 6/1917 | Crane | 152/420 |
| 1,744,405 | 6/1930 | McCord | 152/418 |
| 1,776,933 | 9/1930 | Simmen | 417/211 |
| 2,211,935 | 8/1940 | Parker | 152/419 |
| 2,415,618 | 2/1947 | West | 230/172 |
| 2,577,458 | 12/1951 | Gaiptman | 152/416 |
| 3,099,309 | 7/1963 | Horta | 152/416 |
| 3,511,294 | 5/1970 | Bepristis | 152/418 |
| 4,154,279 | 5/1979 | Tsuruta | 152/416 |
| 4,269,252 | 5/1981 | Shapiro | 152/426 |
| 4,313,483 | 2/1982 | Brockmann | 152/416 |
| 4,418,737 | 12/1983 | Goodell et al. | 152/416 |
| 4,570,691 | 2/1986 | Martus | 152/332.1 |
| 4,582,107 | 4/1986 | Scully | 152/417 |
| 4,583,566 | 4/1986 | Kalavitz | 137/101.19 |
| 4,598,750 | 7/1986 | Gant | 152/416 |
| 4,619,303 | 10/1986 | Bryan et al. | 152/416 |
| 4,685,501 | 8/1987 | Williams | 152/417 |
| 4,705,090 | 11/1987 | Bartos | 152/417 |
| 4,742,857 | 5/1988 | Gandhi | 152/418 |
| 4,744,399 | 5/1988 | Magnuson et al. | 152/417 |
| 4,754,792 | 7/1988 | Braun et al. | 152/417 |
| 4,763,709 | 8/1988 | Scholer | 152/416 |
| 4,875,509 | 10/1989 | Da Silva | 141/38 |
| 4,924,926 | 5/1990 | Schultz et al. | 152/417 |
| 5,325,902 | 7/1994 | Loewe et al. | 152/419 |
| 5,472,032 | 12/1995 | Winston et al. | 152/415 |
| 5,505,080 | 4/1996 | McGhee | 73/146.5 |
| 5,556,489 | 9/1996 | Curlett et al. | 152/418 |
| 5,558,730 | 9/1996 | Olney et al. | 152/418 |
| 5,591,281 | 1/1997 | Loewe | 152/418 |
| 5,616,196 | 4/1997 | Loewe | 152/426 |
| 5,667,606 | 9/1997 | Renier | 152/421 |

FOREIGN PATENT DOCUMENTS

| | | |
|---|---|---|
| 1011756 | 7/1957 | Germany . |
| 60-148705 | 8/1985 | Japan . |

*Primary Examiner*—Francis J. Lorin
*Attorney, Agent, or Firm*—Stetina Brunda Garred & Brucker

[57] ABSTRACT

A battery-powered tire pressure monitor and inflation system which is mounted entirely on or within a vehicle wheel, preferably on the inner surface of a wheel cover. The entire system rotates concurrently with the vehicle wheel, thereby eliminating the need for any interconnection between non-rotating and rotating components of the vehicle. The preferred system also incorporates a centrifugal intake valve apparatus, which remains closed until the vehicle wheel exceeds a minimum rotational rate. The centrifugal intake valve closure apparatus thereby prevents fluids or particles from being drawn into the compressor.

2 Claims, 2 Drawing Sheets

BATTERY-POWERED, WHEEL-MOUNTED TIRE PRESSURE MONITOR AND INFLATION SYSTEM

FIELD OF THE INVENTION

The present invention relates generally to fluid pressure control systems, and more particularly to a battery-powered automatic tire pressure monitor and inflation system which is fully mounted on or contained within a vehicle wheel, for maintaining a desired inflation pressure within a vehicle tire mounted on said wheel.

BACKGROUND OF THE INVENTION

The prior art has included a number of devices and systems for controlling the pressure within a vehicle tire.

A number of these prior art devices and systems were not entirely mounted on a vehicle wheel, but rather included parts or components which were mounted on the vehicle body or frame. Such devices and systems typically require some form of rotating joint, mechanical, electrical or pneumatic connection to establish communication between the parts or components mounted on (and rotating with) the wheel, and those mounted on the body or frame of the vehicle.

For example, U.S. Pat. No. 5,325,902 (Loewe et al) describes an Automatic Tire Pressure Monitor And Inflation System having an electric motor, an air compressor disposed upon the rotating wheel, and an electrical generator. The generator includes a first generator component which is mounted on the rotating wheel and a second generator component which is mounted on a non-rotating portion of the vehicle. Thus, this system includes a rotating connection whereby, the wheel-mounted components of the generator will interact with the vehicle-mounted components thereof, to induce a voltage for driving the electric motor.

There remains a need in the art for the development of a fully wheel-mounted device or system for maintaining a desired inflation pressure within a vehicle tire, without the need for the mounting of additional parts or components on non-rotating portions of the vehicle.

SUMMARY OF THE INVENTION

The present invention comprises a battery-powered wheel-mounted system for maintaining a desired pressure within a vehicle tire. In general, the system comprises a battery, a motor, a compressor, and a pressure sensor, all of which are mounted on or within the vehicle wheel. The sensor is operative to sense when the tire pressure is below a predetermined level. When the tire pressure is determined to be below said predetermined level, the sensor will trigger closure of a switch between the motor and the battery. The motor drives the compressor to pump air into the vehicle tire until the tire pressure exceeds another higher predetermined level. When the tire pressure is determined to exceed said higher predetermined level, the sensor will trigger the switch to open, thereby terminating the passage of current from the battery to the motor and thereby terminating operation of the compressor.

Further aspects, objects and advantages will become apparent to those skilled in the art upon reading and understanding of the following detailed description and the accompanying drawings.

DETAILED DESCRIPTION OF THE PREFERRED EMBODIMENT

Figure 1:
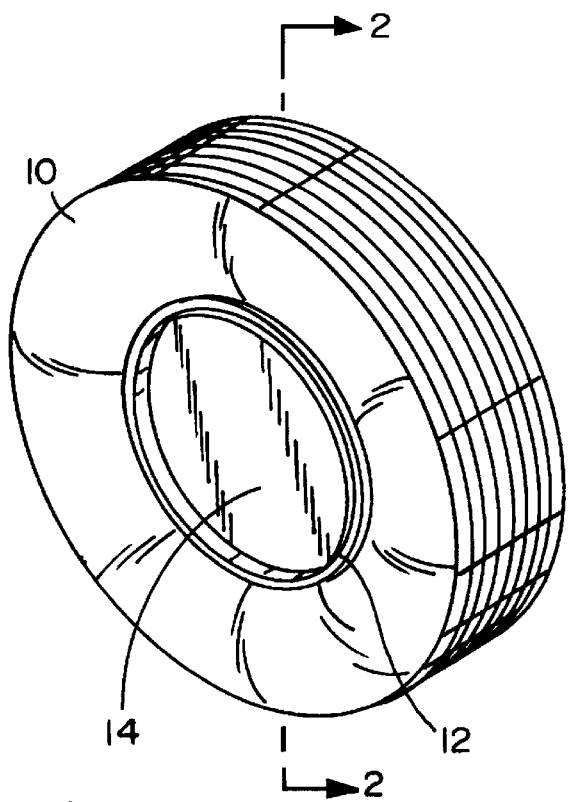
FIG. 1 is a perspective view of a vehicle wheel and tire having a battery-operated tire pressure monitor inflation system of the present invention mounted thereon.
Figure 2:
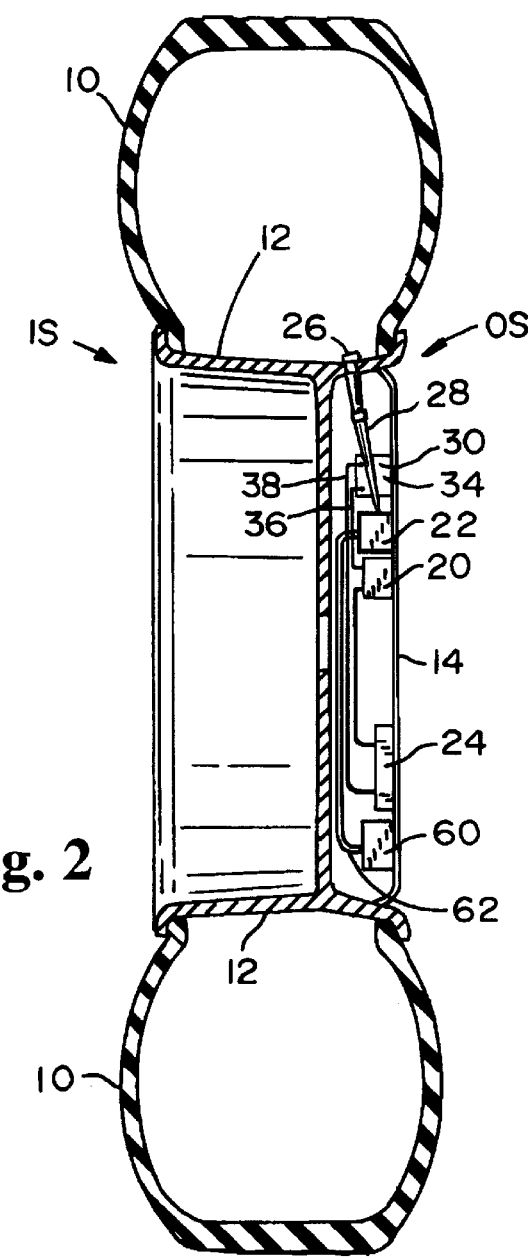
FIG. 2 is a cross sectional view through line 2—2 of FIG. 1.

The following detailed description and the accompanying drawings are provided for purposes of describing and illustrating a presently preferred embodiment of the invention only, and are not intended to limit the scope of the invention in any way.

With reference to the drawings, there is shown a vehicle tire 10 mounted on a wheel 12. The vehicle tire 10 and wheel 12 have an outer surface OS and an inner surface IS. A wheel cover 14 is mounted on the outer surface OS of the wheel 12, as shown.

The preferred battery-operated tire pressure monitor and inflation system 16 is mounted on the interior of the wheel cover 14. The system 16 comprises a battery 24, a Dd motor 20 and a compressor 22. The compressor 22 is connected to the valve stem 26 by way of a tube 28. A pressure sensor 30 is connected to the valve stem 26, and is operative to continually sense the pressure within the tire 10.

A switch 34 is mounted on or incorporated into the pressure sensor 30 and is operative to a) close when the pressure sensor 30 senses pressure within the tire 10 below a minimum predetermined level and b) open when the pressure sensor 30 senses pressure within the tire 10 above a maximum predetermined level. One side of the pressure sensor switch 34 is connected to motor 20 by way of wire 36. The other side of pressure sensor switch 34 is connected to battery 24 by way of wire 38. Thus, when the pressure sensor switch 34 is closed, the circuit is completed between the battery 24 and motor 20. Conversely, when the pressure sensor switch 34 is open, the circuit is not completed between battery 24 and motor 20.

In this regard, the pressure sensor 30 is set to sense a pressure within the tire 10 below a predetermined minimum pressure which is equal to the desired minimum pressurization of the tire 10. When the pressure sensor 30 determines that the pressure within the tire 10 is below the minimum predetermined level, pressure sensor switch 34 will close, thereby completing the circuit between battery 24 and motor 20. This results in energization of the motor 20, and operation of compressor 22. Such operation of compressor 22 passes compressed air through tube 28, through valve stem 26 and into tire 10. The compressor 22 continues to run until the pressure within the tire 10 has been replenished to exceed the predetermined maximum pressure level. When the pressure sensor 30 determines that the pressure within the tire 10 exceeds the predetermined maximum pressure level, the pressure sensor switch 34 will open, thereby disrupting the circuit between the battery 24 and the motor 20. This causes the motor 20 to stop, with concurrent stoppage of the compressor 22.

Figure 3:
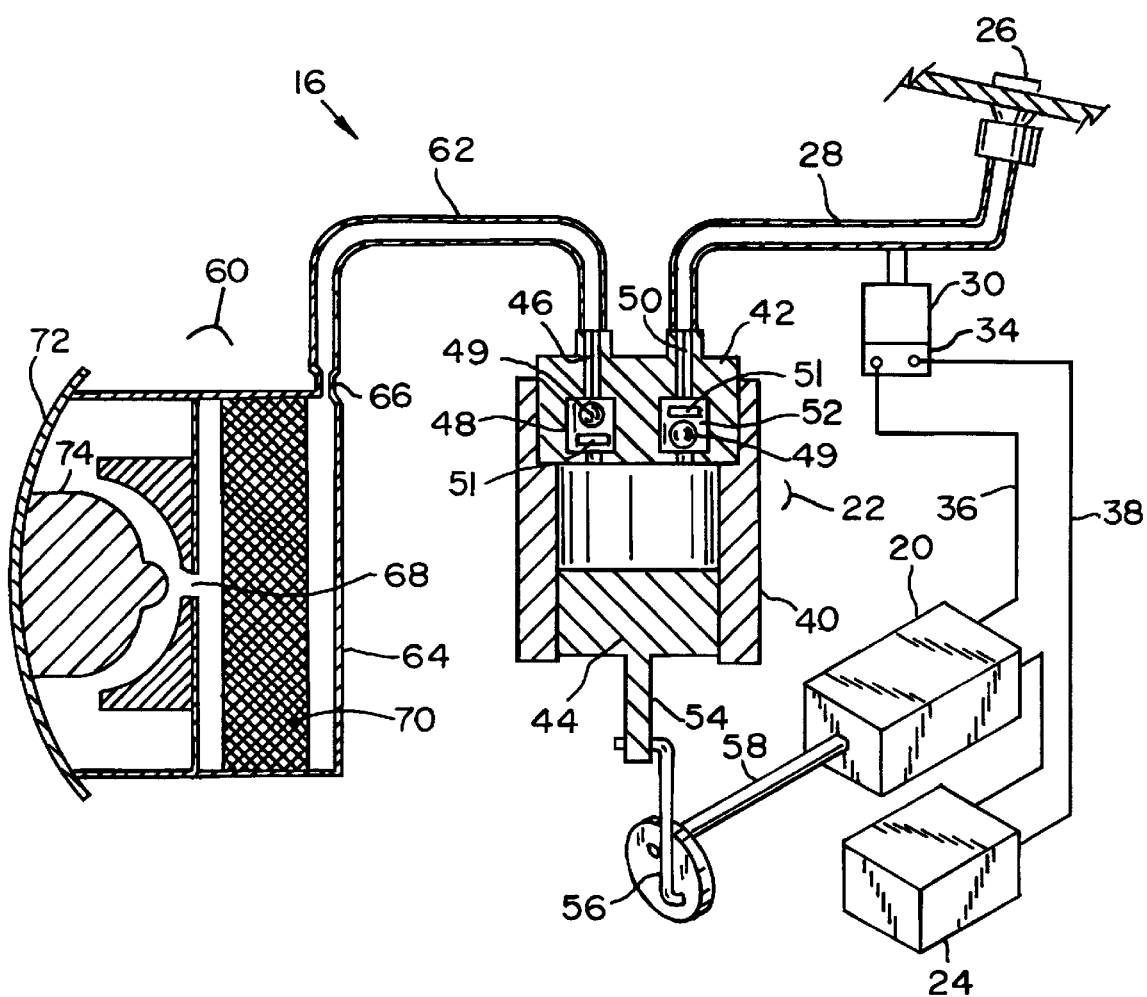
FIG. 3 is a schematic diagram of a preferred embodiment of the battery-operated, wheel-mounted tire pressure monitor and inflation system of the present invention.

It will be appreciated that the specific configuration and construction of the above-described components of the system may vary. However, an exemplary mode of constructing the components of the system 16 is shown in FIG. 3. As shown, the compressor 22 may comprise a cylinder 40 having an inlet/outlet valve assembly 42 mounted thereon and a piston 44 slidably disposed therein. The inlet/outlet valve assembly 42 comprises an inlet passageway 46 having an inlet valve 48 disposed therein, and an outlet passageway 50 having an outlet valve 52 disposed therein. The inlet valve 48 and outlet valve 52 each contain a neoprene ball 49 and porous disc 51 arranged so that the inlet valve 48 permits air to enter the cylinder 40 and blocks air flow out of the cylinder 40 and so that the outlet valve 52 permits air to flow out of the cylinder 40 and blocks air from entering the cylinder 40.

A centrifugal intake valve 60 is connected to the inlet passage way 46 by way of intake valve tube 62. The centrifugal intake valve 60 comprises a housing 64 having an outlet 66 leading to intake valve tube 62 and a centrifugal valve inlet 68. A filter 70 is disposed within the housing 64, between the 68 and the centrifugal valve outlet 66. A spring 72 and plug 74 are mounted adjacent the centrifugal valve inlet 68.

The piston 44 is connected to the end of a rod 54. The rod 54 is connected to the motor drive shaft 58 by way of a suitable linkage 56 such that, rotation of the motor drive shaft 58 causes the piston 44 and rod 54 to reciprocate in and out of the cylinder 40. It will be appreciated that any type of power-transfer linkage 56 capable of causing the piston 44 and rod 54 to reciprocate in accordance with rotation of the motor shaft 58 be utilized. For example, a worm gear may be disposed on the motor shaft 58 and connected, by an appropriate crank or other mechanism, to the rod 54 of the piston 44 so as to provide the desired reciprocal movement of the piston 44.

The spring 72 and plug 74 of the centrifugal intake valve 60 are constructed and configured such that the spring 72 will force the plug 74 into sealing contact with the opening of the intake passageway 68 unless the wheel 12 is rotating at a sufficient rate to create enough centrifugal force on the mass of the plug to overcome the spring 72 force, thereby allowing the plug 74 to move away from the opening of the intake passageway 68. This allows air to be drawn into the compressor 22 only when the wheel 12 is rotating at a rate which is sufficient to cause the centrifugal force on the mass of the plug to overcome the spring 72 force and cause the plug 74 to move away from the opening of the intake passageway 68. This insures that foreign objects or particulate matter or fluids will not be aspirated into the compressor 22 while the vehicle wheel is stationary or slowly rotating.

Each intake stroke of the piston 44 causes the intake valve 48 to open, and draws air into the intake valve inlet 68, through filter 70, through intake valve outlet 66, through intake valve tube 62, through compressor inlet passageway 46 and into the interior of the cylinder 40.

Thereafter, as the piston 44 undergoes its compression stroke, the inlet check valve 48 will close the outlet check valve 52 will open and the air contained within the cylinder 40 will be expelled through compressor outlet passageway 50, through tube 28, through valve stem 26 and into the interior of the tire 10.

When the pressure sensor 30 determines that the inflation pressure of the tire 10 exceeds the predetermined maximum pressure, the pressure sensor switch 34 will open, thereby breaking the circuit between the battery 24 and motor 20. This results in de-energization of the motor 20, and halts operation of the compressor 22. The motor 20 and compressor 22 will remain inoperative until such time as the inflation pressure of the tire 10 again falls below the predetermined minimum pressure. At that time, the pressure sensor switch 34 will again close, thereby repeating the above-described operation of the system.

It will be appreciated that normal vehicle tire leakage rates can be compensated by operation of a tiny air compressor, for only short periods of time. Thus, a small battery 24 is likely to last for many years. Moreover, because the system 16 is conveniently mounted on the interior of the wheel cover 14, the battery 24 may be easily accessed, by removing the wheel cover 14, for the purpose of replacing the battery 24.

It will be appreciated that the above-described preferred embodiment is not intended to show the only possible means of constructing the system of the present invention. Various additions, deletions, modifications and alterations may be made to the above-described preferred embodiment without departing from the intended spirit and scope of the invention. Accordingly, it is intended that all such additions, deletions, modifications and alterations be included within the scope of the following claims.

What is claimed is:

1. A system disposed entirely upon a wheel for maintaining the inflation pressure of a tire mounted on said wheel, above a predetermined minimum pressure, said system comprising:

a) a sensing apparatus disposed upon and carried by said wheel for sensing the inflation pressure of the tire;

b) a compressor apparatus disposed upon and carried by said wheel to be responsive to said sensing apparatus and connected to said tire such that, when said sensing apparatus determines that the inflation pressure of said tire is below said predetermined minimum pressure, said compressor apparatus will pass an inflation fluid into said tire until said sensing apparatus determines that said inflation pressure exceeds a predetermined maximum pressure;

c) an intake valve connected to said compressor apparatus, said intake valve comprising an intake valve inlet through which air is drawn into said compressor apparatus, and further comprising a centrifugal intake valve closure apparatus operative to close off said intake valve inlet when said vehicle wheel is not rotating above a rotational rate that precludes entry of liquids or particles, but operative to open said intake valve inlet when vehicle wheel is rotating at a sufficient rotational rate to expel foreign particles or fluids by centrifugal force; and d) a battery disposed upon and carried by said wheel, said battery being in direct non-rotating electrical contact with both the sensing apparatus and the compressor apparatus such that the compressor apparatus is automatically activated when the inflation pressure is below said predetermined minimum pressure to thereby pass inflation fluid into said tire and automatically deactivated when said predetermined maximum inflation pressure is exceeded.

2. The system of claim 1 wherein said centrifugal intake valve closure apparatus comprises a spring member having a plug attached thereto, said spring member being positioned relative to said intake valve inlet such that, when said vehicle wheel is rotating at said sufficient rotational rate, the force of said spring member will be overcome by the centrifugal force on said plug to move said plug away from said intake valve inlet, and when said vehicle wheel is rotating at less than said sufficient rotational rate, said spring member will force said plug against said intake valve inlet, thereby blocking said intake valve inlet.

\* \* \* \* \*